US012645889B2

(12) United States Patent
Khani et al.

(10) Patent No.: US 12,645,889 B2
(45) Date of Patent: Jun. 2, 2026

(54) INTELLIGENT SYSTEM AND METHOD OF OPTIMIZING NATURAL LANGUAGE PROCESSING MODELS

(71) Applicant: Microsoft Technology Licensing, LLC, Redmond, WA (US)

(72) Inventors: Fereshte Khani, San Francisco, CA (US); Zexue He, La Jolla, CA (US); Marco Tulio Correia Ribeiro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 18/311,439

(22) Filed: May 3, 2023

(65) Prior Publication Data

US 2024/0370662 A1 Nov. 7, 2024

(51) Int. Cl.
*G06F 40/40* (2020.01)
*G06N 5/022* (2023.01)

(52) U.S. Cl.
CPC ............. *G06F 40/40* (2020.01); *G06N 5/022* (2013.01)

(58) Field of Classification Search
CPC .......... G06F 40/30; G06F 40/40; G06F 40/47; G06F 40/56; G06F 40/137; G06F 40/166; G06F 40/274
See application file for complete search history.

(56) References Cited

U.S. PATENT DOCUMENTS

| | | | | |
|---|---|---|---|---|
| 8,694,305 B1* | 4/2014 | Grove | .................... | G06F 40/40 |
| | | | | 704/4 |
| 2018/0203833 A1* | 7/2018 | Liang | .................... | G06F 3/0482 |
| 2019/0205391 A1* | 7/2019 | Dobrynin | ................ | G06F 9/454 |
| 2019/0237061 A1* | 8/2019 | Rusak | .................. | G06F 40/216 |
| 2022/0171938 A1* | 6/2022 | Jalaluddin | ............. | G06F 40/242 |

(Continued)

OTHER PUBLICATIONS

International Search Report and Written Opinion received for PCT Application No. PCT/US2024/025099, Jul. 31, 2024, 11 pages.

(Continued)

*Primary Examiner* — Abdelali Serrou
(74) *Attorney, Agent, or Firm* — Han Gim; Newport IP, LLC

(57) ABSTRACT

A system and method and for method for optimizing performance of a natural language processing (NLP) model includes clustering a validation dataset used in training the NLP model into a plurality of clusters; measuring a generalization in context parameter for one or more of the plurality of clusters; measuring an interference in context parameter for one or more of the plurality of clusters; and identifying a cluster, from among the plurality of clusters, for data augmentation, based on the measured generalization in context parameter and the measured interference in context parameter. Once a cluster is identified, a prompt is generated for submission as an input to a large language model (LLM) to prompt the LLM to automatically generate synthetic training data for the identified cluster, before the prompt is provided to the LLM and synthetic training data is received from the LLM. The synthetic training data is then labeled by a human before being used to further train the NLP model to improve the performance of the NLP model with respect to the identified cluster.

20 Claims, 9 Drawing Sheets

(56) References Cited

U.S. PATENT DOCUMENTS

| | | | | |
|---|---|---|---|---|
| 2022/0261535 A1 | | 8/2022 | Madaan et al. | |
| 2022/0319496 A1 | * | 10/2022 | Rosenberg | G10L 15/065 |
| 2024/0202458 A1 | * | 6/2024 | Zha | G06F 40/279 |
| 2024/0211686 A1 | * | 6/2024 | Davis | G06F 40/30 |

OTHER PUBLICATIONS

Bansal, Rajas, "A Survey on Bias and Fairness in Natural Language Processing", In Repository of arXiv:2204.09591v1, Mar. 6, 2022, 10 Pages.

Bowman, et al., "A Large Annotated Corpus for Learning Natural Language Inference", In Proceedings of the 2015 Conference on Empirical Methods in Natural Language Processing, Sep. 17, 2015, pp. 632-642.

Brown, et al., "Language Models are Few-Shot Learners", In Repository of arXiv:2005.14165v4, Jul. 22, 2020, 75 Pages.

Damodaran, Prithiviraj, "Parrot Paraphraser", Retrieved From: https://github.com/PrithivirajDamodaran/Parrot_Paraphraser, Dec. 27, 2022, 11 Pages.

D'Eon, et al., "The Spotlight: A General Method for Discovering Systematic Errors in Deep Learning Models", In Proceedings of the ACM Conference on Fairness, Accountability, and Transparency, Jun. 21, 2022, pp. 1962-1981.

Faulbruck, et al., "Generating Synthetic Comments to Balance Data for Text Classification", Retrieved From: https://humboldt-wi.github.io/blog/research/information_systems_1920/text_generation/, Feb. 7, 2020, 62 Pages.

Goel, et al., "Model Patching: Closing the Subgroup Performance Gap with Data Augmentation", In Repository of arXiv:2008.06775v1, Aug. 15, 2020, 30 Pages.

Khani, et al., "Maximum Weighted Loss Discrepancy", In Repository of arXiv:1906.03518v1, Jun. 8, 2019, 22 Pages.

Kiela, et al., "Dynabench: Rethinking Benchmarking in NLP", In Proceedings of the Conference of the North American Chapter of the Association for Computational Linguistics: Human Language Technologies, Jun. 6, 2021, pp. 4110-4124.

Liu, et al., "Just Train Twice: Improving Group Robustness without Training Group Information", In Proceedings of the International Conference on Machine Learning. PMLR, Jul. 1, 2021, 12 Pages.

McCloskey, et al., "Catastrophic Interference in Connectionist Networks: The Sequential Learning Problem", In Proceedings of the Psychology of learning and motivation, vol. 24, Jan. 1, 1989, pp. 109-165.

Prousseeuw, Peter, "Silhouettes: A Graphical Aid to The Interpretation and Validation of Cluster Analysis", In Journal of Computational and Applied Mathematics, vol. 20, Nov. 1, 1987, pp. 53-65.

Rajani, et al., "SEAL: Interactive Tool for Systematic Error Analysis and Labeling", In Repository of arXiv:2210.05839v1, Oct. 11, 2022, 12 Pages.

Reimers, et al., "Sentence-BERT: Sentence Embeddings using Siamese BERT-Networks", In Proceedings of the 2019 Conference on Empirical Methods in Natural Language Processing and the 9th International Joint Conference on Natural Language Processing, Aug. 27, 2019, pp. 3982-3992.

Ribeiro, et al., "Adaptive Testing and Debugging of NLP Models", In Proceedings of the 60th Annual Meeting of the Association for Computational Linguistics, May 22, 2022, pp. 3253-3267.

Ribeiro, et al., "Beyond Accuracy: Behavioral Testing of NLP Models with CheckList", In Proceedings of the 58th Annual Meeting of the Association for Computational Linguistics, Jul. 5, 2020, pp. 4902-4912.

Sagawa, et al., "Distributionally Robust Neural Networks", In Proceedings of the International Conference on Learning Representations, Sep. 26, 2019, 19 Pages.

Sohoni, et al., "No Subclass Left Behind: Fine-Grained Robustness in Coarse-Grained Classification Problems", In Journal of Advances in Neural Information Processing Systems, vol. 33, Dec. 6, 2020, 14 Pages.

Stuart-Ulin, Chloer. , "Microsoft's Politically Correct Chatbot is Even Worse Than Its Racist One", Retrieved From: https://qz.com/1340990/microsofts-politically-correct-chat-bot-is-even-worse-than-its-racist-one, Jul. 31, 2018, 13 Pages.

Thakur, et al., "Augmented SBERT: Data Augmentation Method for Improving Bi-Encoders for Pairwise Sentence Scoring Tasks", In Proceedings of the Conference of the North American Chapter of the Association for Computational Linguistics: Human Language Technologies, Jun. 6, 2021, pp. 296-310.

Yanaka, et al., "Can Neural Networks Understand Monotonicity Reasoning?", In Proceedings of the Second BlackboxNLP Workshop on Analyzing and Interpreting Neural Networks for NLP, Aug. 1, 2019, pp. 31-40.

Yoo, et al., "GPT3Mix: Leveraging Large-scale Language Models for Text Augmentation", In Repository of arXiv:2104.08826v2, Nov. 18, 2021, 15 Pages.

Zhao, et al., "LOGAN: Local Group Bias Detection by Clustering", In Repository of arXiv:2010.02867v1, Oct. 6, 2020, 10 Pages.

* cited by examiner

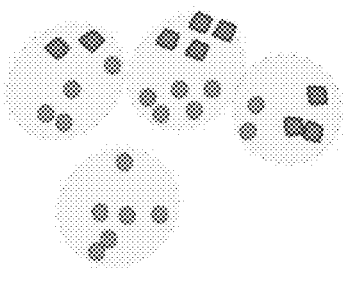
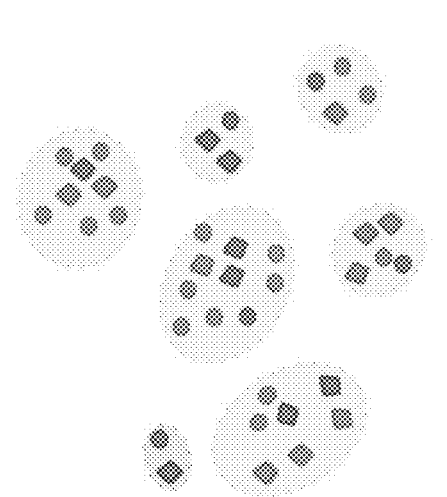
FIG. 3A

FIG. 3C
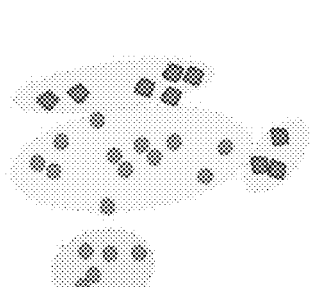
FIG. 3B
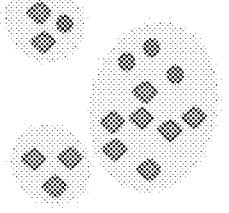

300A

410

CLUSTERING ENGINE
210

412

414

416

500

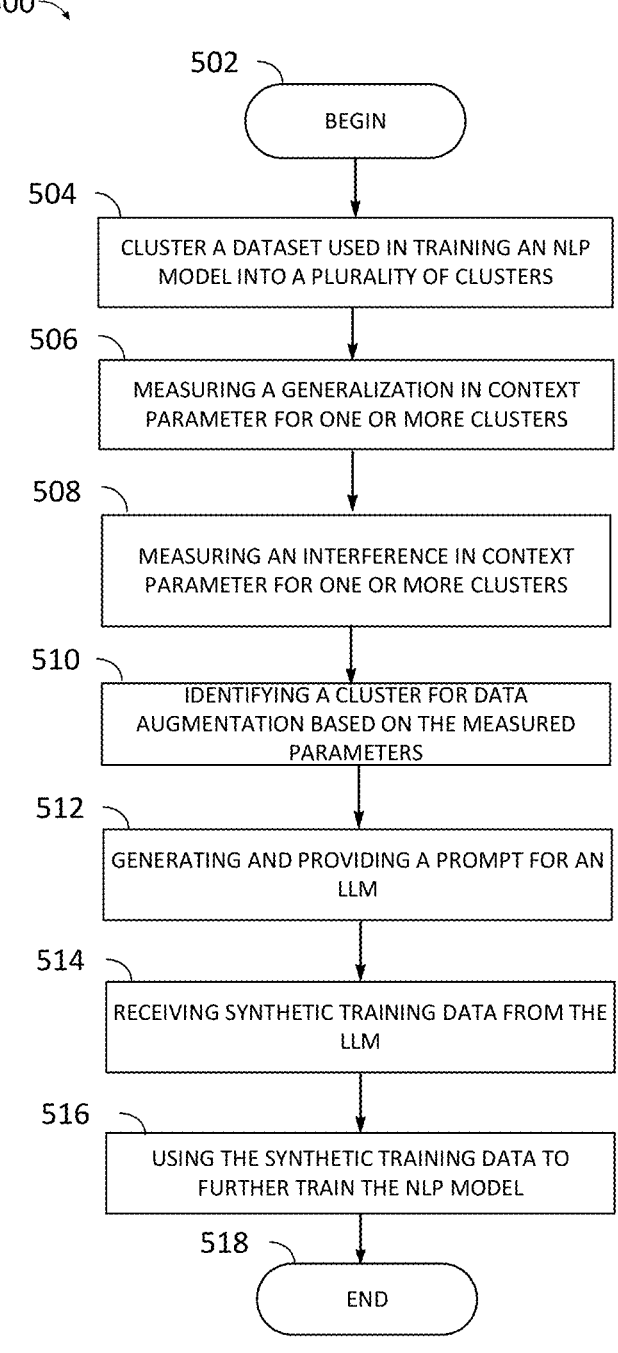

502

BEGIN

504

CLUSTER A DATASET USED IN TRAINING AN NLP MODEL INTO A PLURALITY OF CLUSTERS

506

MEASURING A GENERALIZATION IN CONTEXT PARAMETER FOR ONE OR MORE CLUSTERS

508

MEASURING AN INTERFERENCE IN CONTEXT PARAMETER FOR ONE OR MORE CLUSTERS

510

IDENTIFYING A CLUSTER FOR DATA AUGMENTATION BASED ON THE MEASURED PARAMETERS

512

GENERATING AND PROVIDING A PROMPT FOR AN LLM

514

RECEIVING SYNTHETIC TRAINING DATA FROM THE LLM

516

USING THE SYNTHETIC TRAINING DATA TO FURTHER TRAIN THE NLP MODEL

518

END

FIG. 5

INTELLIGENT SYSTEM AND METHOD OF OPTIMIZING NATURAL LANGUAGE PROCESSING MODELS

BACKGROUND

In recent years, there has been a significant increase in the use of natural language processing (NLP) models. These models refer to machine-learning (ML) models that work by finding relationships between constituent parts of language such as letters, words, and sentences found in a text to achieve specific objectives. NLPs can be used by many different applications for a variety of tasks such as audio to text conversion, speech recognition, sentiment analysis, summarization, spell correction and the like. Because of the wide use of NLP models, it is important that such models provide accurate results. However, even when aggregate accuracy is high, NLP models often fail systematically on specific subgroups of data. This can result in unfair outcomes and as such user unsatisfaction.

Improving accuracy of ML models is often achieved by utilizing larger training datasets. For example, accuracy may be increased by collecting additional training data that relates to a specific shortcoming of an NLP model. However, collecting and adding additional training date may not help in addressing weaknesses in specific subgroups of data, as such challenging subgroups may be unknown to users. Furthermore, the specific subgroups of data for which the NLP lacks accuracy is often underrepresented in both the existing and new data.

Hence, there is a need for improved systems and methods of optimizing NLP models.

SUMMARY

In one general aspect, the instant disclosure presents a data processing system having a processor and a memory in communication with the processor wherein the memory stores executable instructions that, when executed by the processor, cause the data processing system to perform multiple functions. The functions include clustering, using a clustering engine, a dataset used in training a natural language processing (NLP) model into a plurality of clusters; measuring, using a problematic cluster identification engine, a generalization in context parameter for one or more of the plurality of clusters; measuring, using the problematic cluster identification engine, an interference in context parameter for one or more of the plurality of clusters; identifying a cluster, from among the plurality of clusters, for data augmentation, based on at least one of the measured generalization in context parameter or the measured interference in context parameter; generating a prompt for submission as an input to a large language model (LLM) to prompt the LLM to automatically generate augmented training data for the identified cluster; providing the prompt to the LLM; receiving from the LLM the augmented training data; and providing the augmented training data for use in further training the NLP model to improve a performance of the NLP model with respect to the identified cluster.

In yet another general aspect, the instant disclosure presents a method for optimizing performance of an NLP model. In some implementations, the method includes clustering, using a clustering engine, a validation dataset used in training the NLP model into a plurality of clusters; measuring a generalization in context parameter for one or more of the plurality of clusters; measuring an interference in context parameter for one or more of the plurality of clusters;

identifying a cluster, from among the plurality of clusters, for data augmentation, based on at least one of the measured generalization in context parameter or the measured interference in context parameter; generating a prompt for submission as an input to a LLM to prompt the LLM to automatically generate synthetic training data for the identified cluster; providing the prompt to the LLM; receiving from the LLM the synthetic training data; and using the synthetic training data to further train the NLP model to improve the performance of the NLP model with respect to the identified cluster.

In a further general aspect, the instant application describes a non-transitory computer readable medium on which are stored instructions that when executed cause a programmable device to perform functions of accessing, using targeted data generation system, a dataset used in training a NLP model; clustering data in the dataset into a plurality of clusters using one or more clustering mechanisms; identifying, using a problematic cluster identification engine, a cluster from among the plurality clusters for which the NLP model does not perform well; determining that a performance of the NLP model for the identified cluster would improve if the NLP model is trained with more data related to the identified cluster; upon determining that the performance of the NLP model for the identified cluster would improve if the NLP model is trained with more data related to the identified cluster, generating a prompt for submission as an input to a LLM to prompt the LLM to automatically generate training data for the identified cluster; receiving from the LLM the automatically generated training data for the identified cluster; and training the NLP model with the automatically generated training data to improve the performance of the NLP model for the identified cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3C depict examples of utilizing different clustering techniques to cluster the validation dataset of an NLP.

FIG. 5 is a flow diagram depicting an example method for optimizing performance of an NLP model.

DETAILED DESCRIPTION

Figure 1:
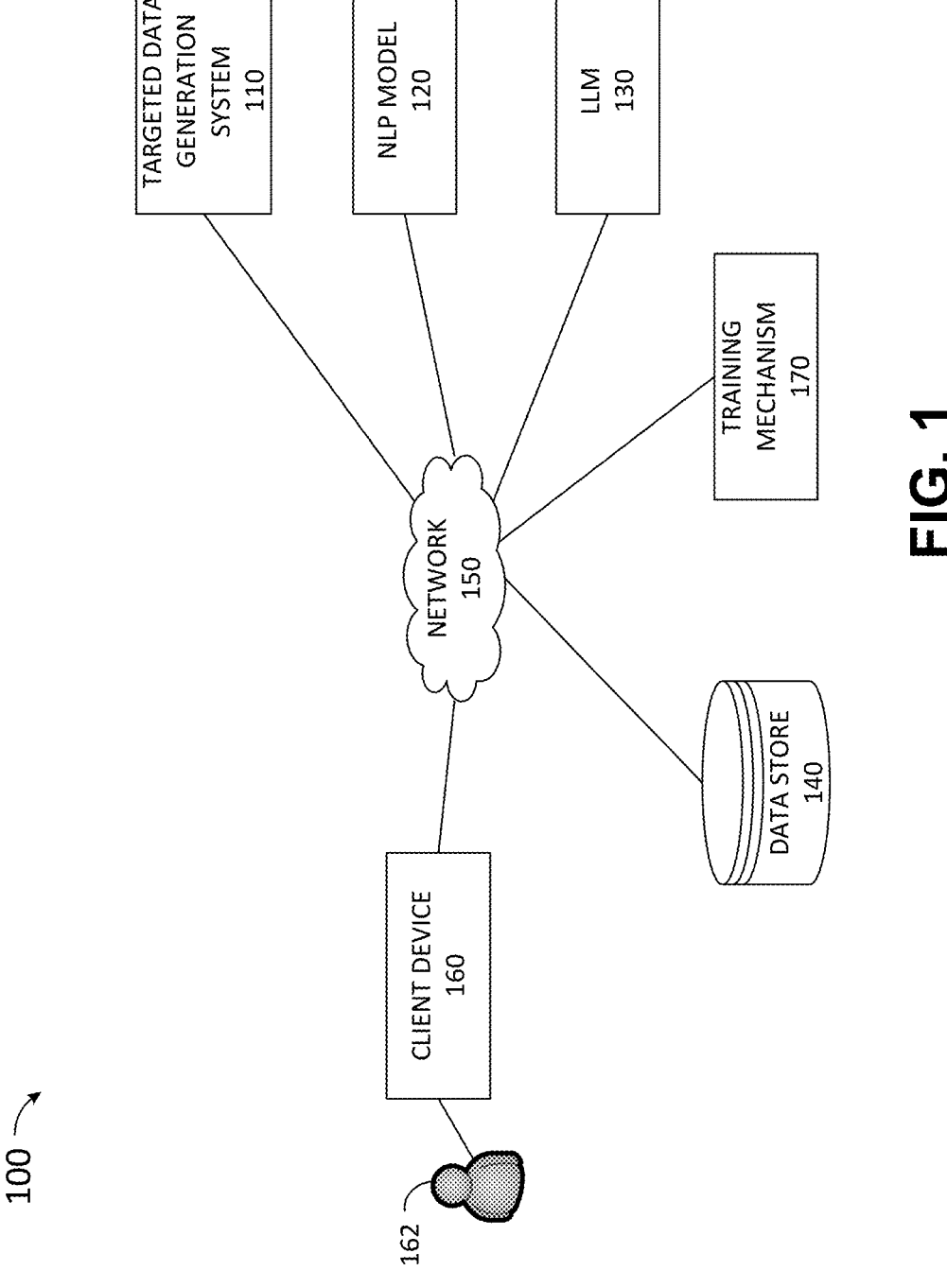
FIG. 1 depicts an example system upon which aspects of this disclosure may be implemented.

Despite having a general high accuracy, many of today's NLP models still exhibit systematic failures on specific subgroups of data. For example, a recent study found that a 95% accurate sentiment analysis model had a much lower level of accuracy for club reviews and move theater reviews. Another analysis showed that a commercial chatbot avoids any engagement on topics that mention the Middle East. Challenges with respect to such subgroups can lead to unfair outcomes, eroding user trust, and ultimately limited deployment of the models, even when aggregate accuracy of the model is high.

To address these issues, some developers resort to collecting or generating more training data for training the models. However, any additional data collected or generated often still provides an undersampling of the specific challenging subgroups, even if data collection is adversarial. This is especially the case, when the challenging subgroups are not obvious or salient to humans. Thus, while time-consuming and expensive, collecting and/or generating additional training data often provides little help in addressing specific challenging subgroups. Furthermore, Tools for discovering challenging subgroups still require human creativity and effort. Some studies have shown that experts are able to improve existing subgroups via careful data augmentation with large language models (LLMs), but finding such challenging subgroups requires human ingenuity and requires a lot of time and resources. Moreover, sometimes augmenting certain subgroups can drastically hurt other subgroups and overall performance. Hence, the challenge is not only to find challenging subgroups, but also to determine which subgroups are amenable to data augmentation, and how to augment them effectively. Thus, there exists a technical problem of lack of efficient and accurate mechanisms for identifying subgroups of data for which NLP models provide inaccurate, unfair and/or biased results. Moreover, there exists another technical problem of identifying subgroups for which data augmentation does not negatively impact other subgroups of data. Furthermore, there exists yet another technical problem of lack of mechanisms for effectively and efficiently generating training data for NLP models to address challenges in specific subgroups.

To address these technical problems and more, in an example, this description provides technical solutions for optimizing performance of NLP models with respect to specific subgroups of data, while maintaining or improving the overall performance of the NLP models. This is achieved by utilizing a system that identifies potentially problematic subgroups via cluster validation, and estimates data needs based on held-out data The system then utilizes a large language model (LLM) such as a generative artificial intelligence (AI) tool (e.g., GPT-3) to create synthetic training data to improve the performance for the identified subgroups. By identifying the problematic subgroups and using the LLM to generate the new training data, the system is able to generate the right amount and the right type of training data. The generated training data is then provided to the NLP model to improve the performance of the NLP for the specific subgroups of data for which it was underperforming, as well as for improving the overall performance of the NLP model.

In some implementations, the technical solution first clusters validation data for the NLP model into potential challenging subgroups. The system then uses held-out data to estimate how much each subgroup would benefit from more data, and how much additional data would hurt performance in other regions. Finally, having identified challenging subgroups amenable to data augmentation, the system utilizes an LLM such as a generative pre-trained transformer (GPT) model (e.g., GPT-3 or GPT-4) coupled with local subgroup models to generate new data, to improve subgroup performance while remaining faithful to the original data distribution.

The technical solution described herein addresses the technical problem of underperformance of NLP models with respect to specific subgroups of data, the difficulty in identifying such subgroups, and the challenge in improving the NLP's underperformance with the identified subgroups without adversely affecting the overall performance of the NLP. The technical solution automatically identifies subgroups of data for which the NLP underperforms, automatically determines whether the identified subgroup is amenable to data augmentation and generates training data for improving the performance of the NLP with respect to the identified subgroup. The technical effects include at least (1) improving the accuracy of NLP models; (2) automatically identifies subgroups of data for which an NLP model underperforms; (3) automatically determining if the identified subgroup is amenable to data augmentation; and (3) generating the right type and amount of training data to improve the performance of the NLP model.

FIG. 1 illustrates an example system 100, upon which aspects of this disclosure may be implemented. The system 100 includes a targeted data generation system 110, an NLP model 120, an LLM 130, a data store 140, and a client device 160. Each of the targeted data generation system 110, an NLP model 120, an LLM 130, a data store 140 may be stored on and/or executed by one or more servers that work together to deliver the functions and services provided by each service or application included in the servers. The servers may also operate as cloud-based servers for offering application or storage services and/or may operate as a shared resource server located at an enterprise accessible by devices.

The targeted data generation system 110 receives a request for optimizing an NLP model such as the NLP model 120. The request may be received from the client device 160 or may be generated automatically. For example, a computer environment may periodically examine its' NLP models to optimize the models and ensure the models operate well for different subgroups. In some implementations, the request is submitted by a user 162 of the client device 160 by utilizing an administrator portal for the system 100 or by using specific applications.

The NLP model 120 may be any trained NLP model that receives textual input and provides language related predictions. As noted above, the NLP model 120 may underperform with respect to specific subgroups of data. Upon receiving the request to optimize the NLP model 120, the targeted generation system 110 communicates with the NLP model 120 to identify potentially problematic subgroups of data for the NLP model 120. The term "problematic subgroups of data" or "challenging subgroups of data" refers to any cluster of input data for which a trained NLP model provides outputs that fall under a given threshold of accuracy (e.g., the results are less than 80% accurate for the data cluster). The terms subgroups of data and data clusters are used interchangeably in this disclosure and refer to the same concept. The targeted data generation system 110 identifies the problematic subgroups of data for the NLP model 120 by clustering a validation dataset for the NLP model 120 into various clusters and examining the clusters to determine if any of the NLP model 120 performs significantly worse on the cluster than the overall validation dataset. The details of identifying problematic subgroups of data are discussed in more detail with respect to FIG. 2.

Once one or more problematic subgroups of data are identified for the NLP model 120, the targeted data generation system 110 communicates with the LLM 130 to automatically generate additional training data for the NLP model 120. The LLM 130 is a deep learning algorithm that can recognize, summarize, translate, predict and/or generate text and other content based on knowledge gained from very large training datasets. Examples of LLMs include, but are not limited to, generative models, such as GPT-based models, e.g., GPT-3, GPT-4, ChatCPT, and the like. The targeted data generation system 110 may use the LLM 130 to generate training data by prompting the LLM 130 to create similar in-cluster examples for the identified data clusters.

In some implementations, a human in the loop, such as the user 162 is used to provide labels for the training data generated by the LLM 130. The user 162 communicates with the targeted data generation system 110 by using one or more local applications (e.g., local applications or web applications) via the network 150. The network 150 may be a wired or wireless network(s) or a combination of wired and wireless networks that connect one or more elements of the system 100. The client device 160 may be a personal or handheld computing device having or being connected to input/output elements that enable user 162 to interact with various applications (not shown). Examples of suitable client devices 160 include but are not limited to personal computers, desktop computers, laptop computers, mobile telephones, smart phones, tablets, phablets, smart watches, wearable computers, gaming devices/computers, televisions, and the like. The internal hardware structure of a client device and/or a server on which one of the targeted data generation system 110, NLP model 120 or LLM 130 is stored is discussed in greater detail with respect to FIGS. 6 and 7.

In some implementations, the NLP model 120 is trained by using the training mechanism 170. The training mechanism 170 uses training data sets stored in the data store 140 to provide initial and ongoing training for the NLP model 120. In some implementations, the training mechanism 170 uses labeled training data to train the NLP model 120 via deep neural network(s) or other types of models. The initial and/or subsequent training may be performed in an offline stage. The data store 140 functions as a repository in which databases relating to training, validation, and testing of the NLP model 120 are stored. Although shown as a single data store, the data store 140 is representative of multiple storage devices and data stores which may be accessible by one or more of the targeted data generation system 110, training mechanism 170, NLP model 120, client device 160 and/or LLM 130. Once additional training data is generated by the LLM 130, the additional training data is stored in the data store 140 for use in training of the NLP model 120.

Figure 2:
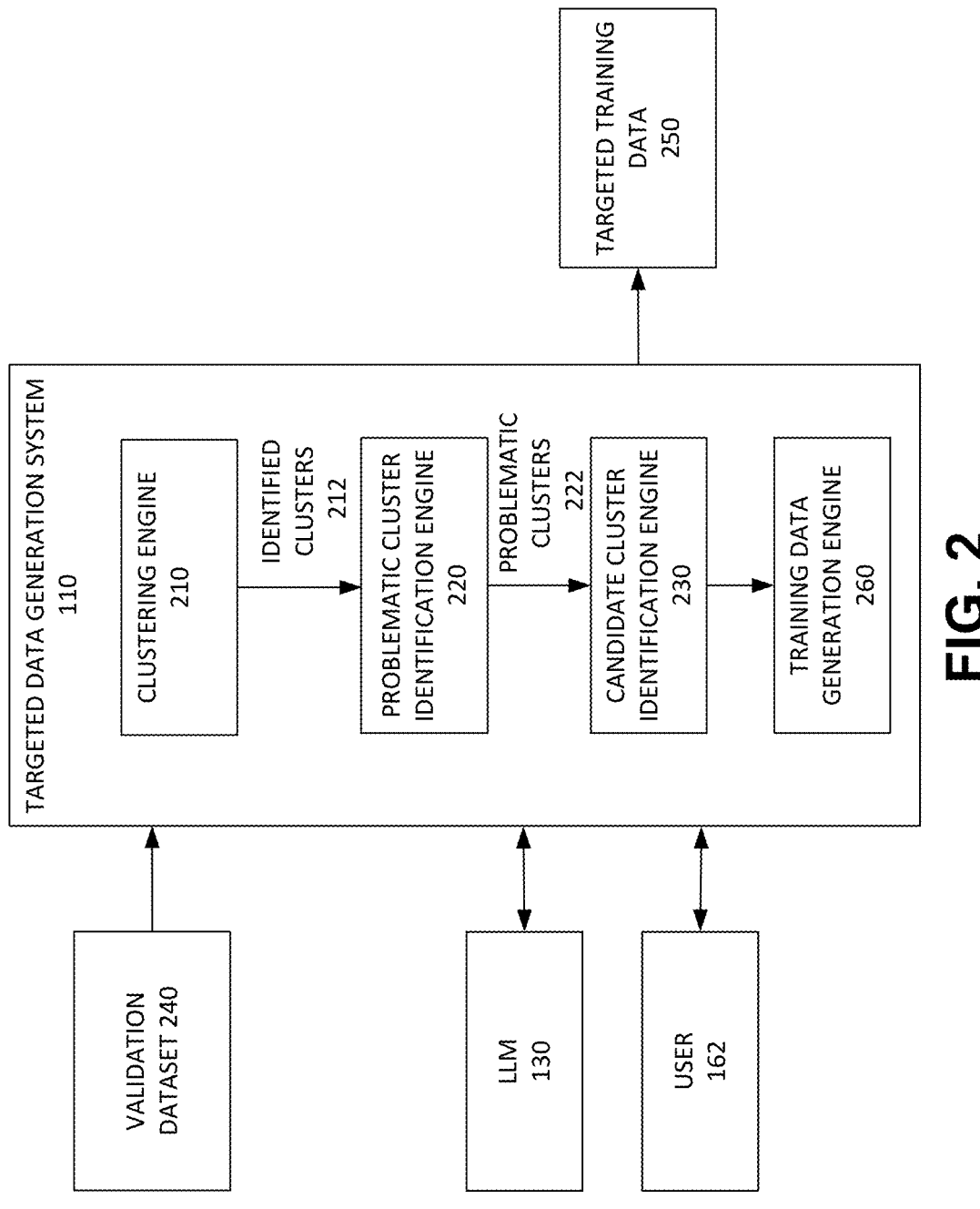
FIG. 2 depicts an example of some elements involved in optimizing an NLP model.

FIG. 2 depicts an example of some elements involved in optimizing an NLP model. Once a request for optimizing an NLP model is received by the targeted data generation system 110 or the targeted data generation system 110 determines that the NLP model requires optimization in another manner, the validation dataset 240 for the NLP model is retrieved by the targeted data generation system 110. The validation dataset may be stored in a data store and accessed by the targeted data generation system 110 for clustering. In some implementations, access to the validation dataset 240 is provided to the targeted data generation system 110 by a user. The validation dataset 240 is used by the targeted data generation system 110 to identify and evaluate challenging subgroups of data. This is achieved by first utilizing the clustering engine 210 to cluster the validation dataset 240.

The clustering engine 210 uses various clustering mechanisms for clustering the validation dataset 240. In some implementations, two or more clustering mechanisms are used. For example, different representation spaces for clustering are utilized, using increasing amounts of information about the task, the model and the labels. The different clustering mechanisms may include an agnostic clustering mechanism, a task-based clustering mechanism, and a task-based and label information clustering mechanism.

The clustering engine 210 implements agnostic clustering of the validation dataset 240 by using general purpose embeddings, such as embeddings extracted from sentence bidirectional encoder representations from transformers (BERT) that are implemented in sentence transformers. In this manner, agnostic clustering does not use any information about the task, the NLP model or the labels. The embedding representations used to cluster the validation data can help capture some patterns that the target NLP model cannot represent well. Augmenting these clusters would teach the NLP model new concepts and/or relationships, which results in optimized performance of the model for the clusters.

Task-based clustering is achieved by using the target NLP model's own representation from the second-to-last layer of the NLP model to cluster the validation dataset 240. This type of representation reflects how the target NLP model perceives the data, as such may group together examples that the model considers similar or difficult. If the NLP model relies on spurious correlations or heuristics, the clusters that the model considers similar or difficult may appear in the second-to-last layer representation and as such get clustered together by using this mechanism. Augmenting these clusters would cause the NLP model to learn more robust features or strategies with respect to these clusters, and as such optimizes the NLP model for these clusters.

Another clustering approach involves using the same representations used for task-based clustering, discussed above, but with the constraint that all data points in each cluster have the same label. While this creates clusters that are clearly label-imbalanced, datapoints in problematic subgroups also tend to have the same label. As a result, this clustering technique yields clusters with either very low or very high error rates. Thus, examining the clusters created in this manner can help identify problematic clusters.

FIGS. 3A-3B depict examples of utilizing different clustering techniques to cluster the validation dataset of an NLP. The examples in FIGS. 3A-3B depict cluster results on binary classification with different clustering techniques. Data points from binary categories are identified by circles and squares in FIGS. 3A-3B, while errors are depicted by dark gray circles or squares. FIG. 3A depicts agnostic clustering of datapoints where positive and negative data points are mixed together. As depicted, the clustering is able to identify some clusters with a significant number of errors. FIG. 3B depicts task-based clustering where most data points of one category are located at one side of the decision boundary of the NLP model and positive/negative points are mixed in the clusters. As shown, the clustering is able to identify certain clusters of error points. FIG. 3C shows task-based clustering of datapoints with the use of label information. As depicted, besides being separable, data points with the same label are clustered together, thus resulting in clusters with very high and very low error rates.

Referring back to FIG. 2, once the clustering engine 210 creates multiple clusters in the validation dataset 240, the resulting identified clusters 212 are transmitted to a problematic cluster identification engine 220. To determine which ones of the identified clusters 212 can be categorized as problematic subgroups, the problematic cluster identification engine 220 determines if the target NLP model's percentage of accurate results is a lot lower for a given cluster than it is for the overall validation set. This is achieved by first clustering a validation dataset, as discussed above. The validation dataset is denoted as $D_{val}$ and is clustered into k disjointed clusters, C, where $C=\{C_1, C_2, \ldots, C_{1k}\}$. In some implementations, the validation dataset $D_{val}$ is first divided into two random haves, a first set used for automatic discovery of problematic clusters and a second used for evaluation. Clustering is performed on the first set of the divided validation dataset. Similarly, clustering is done on the second set of the divided validation dataset. The clusters are then compared and for each cluster in the first set an aligned cluster in the second set is identified, such that each cluster in the first set has an aligned cluster in the evaluation set. In this manner, each cluster is divided into $C_{train}$ and $C_{test}$ to simulate the effect of data augmentation and its impact on the same cluster. The divided clusters are then provided as inputs to the NLP models and the outputs are evaluated for accuracy. The problematic cluster identification engine 220 identifies clusters for which the target NLP model significantly underperforms compared to the overall validation dataset. The percentage by which the NLP model should underperform for a cluster for the cluster to be considered problematic may depend on a variety of factors and may vary from one NLP to another. The identified clusters are identified as being problematic clusters or subgroups of data. Thus, denoting the NLP model as M, clusters for which ACC (M, $C_{train} \cup C_{val}$)<<ACC (M, $D_{val}$) are identified as being problematic. The identified problematic clusters 222 are transmitted to a candidate cluster identification engine 230.

The candidate cluster identification engine 230 determines whether the identified problematic clusters are amenable to data augmentation. This involves determining whether adding more training data to the dataset would generalize and improve performance on the given cluster (e.g., on $C_{test}$), without hurting the performance of the model on $D_{test}$. This may be achieved by simulating the training of the model using additional data and evaluating the resulting model to determine whether the model performs more accurately with respect to the cluster without adversely affecting the overall performance of the model.

In some implementations, the candidate cluster identification engine 230 identifies clusters that are amenable to data augmentation by utilizing generalization and interference in context. Given the context of ($D_{train}$, M) and a target cluster C, the candidate cluster identification engine 230 generates a revised model M' by training the NLP model on a mixture of training dataset, $D_{train}$ and $C_{train}$. This gives more weight to examples from the target cluster C as a surrogate for data augmentation for the cluster. The revised model is then evaluated using two statistical parameters to determine whether the model's performance with respect to the cluster improved from the original model. The parameters used to evaluate the revised model include a generalization in context parameter, denoted as GC and an interference in context parameter, denoted as IC.

The candidate cluster identification engine 230 identifies a cluster C as generalizing in context of the model M and dataset D, if more training on the cluster leads to better performance of the model on hidden examples from the cluster. Thus, generalization in context can be measured by the formula depicted below in equation 1.

$$GC(C) = ACC(M', C_{val}) - ACC(M, C_{val}) \qquad (1)$$

Generalization in context measures how much the model can learn from more training data for the cluster and weather that learning transfers to unseen data from the same cluster. A high generalization in context indicates that the cluster is challenging but data augmentation can improve the cluster. On the other hand, a low generalization in context indicates that the cluster is already saturated by existing data or that is difficult for the model to learn for the cluster, such that more data from the cluster does not improve the models' performance for the cluster. This means that if clustering was done randomly (e.g., clusters were selected randomly), the resulting GC would be low for the cluster, as training on a random subset of data would not improve performance on another random subset. However, if the clustering is based on a meaningful feature that the model struggles with, the resulting GC is likely high as training on more data from the cluster would probably help the model improve its weaknesses.

In addition to measuring a cluster's generalization in context, the candidate cluster identification engine 230 measures the cluster's interference in context. A cluster is determined to interfere with the original data if augmenting the cluster leads to worse performance on the original data. Interference in context for a cluster C can be measured using equation 2.

$$IC(C) = ACC(M, D_{val}) - ACC(M', D_{val}) \qquad (2)$$

A high interference in context indicates that the cluster is incompatible with the original training data and that data augmentation would degrade the overall performance of the model. On the other hand, a low interference in context indicates that the cluster is either similar to the original data or sufficiently different but not conflicting such that data augmentation would not adversely affect the overall performance of the model. For example, if cluster C is label-imbalanced and the training dataset D is label-balanced, interference in context would be high for that cluster, as training on more data from cluster C may bias the model towards a certain label and hurt performance on the training dataset D. In contrast, if cluster C and training dataset D are from different domains but share some common concepts, the interference in context for that cluster would be low, as training on more data from cluster C would not confuse the model on the training dataset D. A negative interference in context indicates that augmenting the cluster actually improves the overall performance of the model, which could happen if the original training dataset is small and the model has not saturated it yet, or if there is some domain shift between $D_{test}$ and $D_{train}$ and the augmentation helps to bridge that shift.

In summary, the candidate cluster identification engine 230 uses generalization in context to measure whether a cluster benefits from more data and uses interference in context to measure whether augmenting the training data for the cluster would negatively impact the performance of the model on the original dataset. The candidate cluster identification engine 230 aggregates generalization in context and interference in context over all the clusters by taking an average of the GC and IC, as depicted in equations 3 and 4, to arrive at an overall GC and IC.

$$\overline{GC} = \sum\nolimits_{i=1}^{k} \frac{GC(C_i)}{k} \tag{3}$$

$$\overline{IC} = \sum\nolimits_{i=1}^{k} \frac{IC(C_i)}{k} \tag{4}$$

Once the generalization in context and interference in context are calculated for the problematic clusters 222, the candidate cluster identification engine 230 identifies, using the measured generalization in context and interference in context parameters, one or more clusters from among the problematic clusters 222 for data augmentation. The candidate cluster identification engine 230 achieves this by evaluating the clustering representations using the aggregate generalization in context and interference in context parameters of the one or more top clusters ranked by their error rates. The number of top clusters selected for augmentation may vary and may depend on a variety of factors such as the resources available for augmentation. In some implementations, a specific number of clusters (e.g., k clusters) are allowed to be selected for augmentation. In this manner, the selected clusters are chosen such that the most augmentable clusters that do not negatively impact the overall performance of the model are selected for augmentation. The selection process is formalized in equation 5.

$$C_k^* = \underset{C_k}{\mathrm{argmax}}\left[\overline{GC}(C_k) - \overline{IC}(C_k)\right] \tag{5}$$

After the candidate clusters for augmentation have been selected by the candidate cluster identification engine 230, the selected clusters are transmitted to the training data generating engine 260 to initiate generating augmented training data for the clusters. In some implementations, the training data generating engine 260 provides the original training data from the selected clusters to the LLM 130 as the initial prompts for generating training data. In response, the LLM 130 generates synthetically generated training data which is similar to the in-cluster training data examples for the selected clusters. In some implementations, the generated training data is provided to the user 162 for labeling. The labeled training data is then provided to the targeted data generation system 110 which may output the labeled training data as targeted training data 250. The targeted training data 250 may be stored in a data store separate from the original training dataset. Additionally or alternatively, the targeted training data 250 may be added to the original training dataset to generated an augmented training dataset. The targeted training data 250 is also provided to the NLP (e.g., NLP 120) to finetune the model and improve the performance of the model on the problematic clusters.

In some implementations, generating augmented training data using the LLM 130 involves finetuning a small local model on each cluster's data and comparing results from the local model with the current version of the NLP model to identify disagreements between the local model and the current version of the NLP. The disagreements are then used to rank the synthetically generated training data, retain the higher ranked examples and regenerate data based on higher ranked examples. This process may be repeated until the current version of the cluster's local model mostly agrees with the current version of the NLP model. At this point the generated training data may be used as the target training data.

Figure 4A:
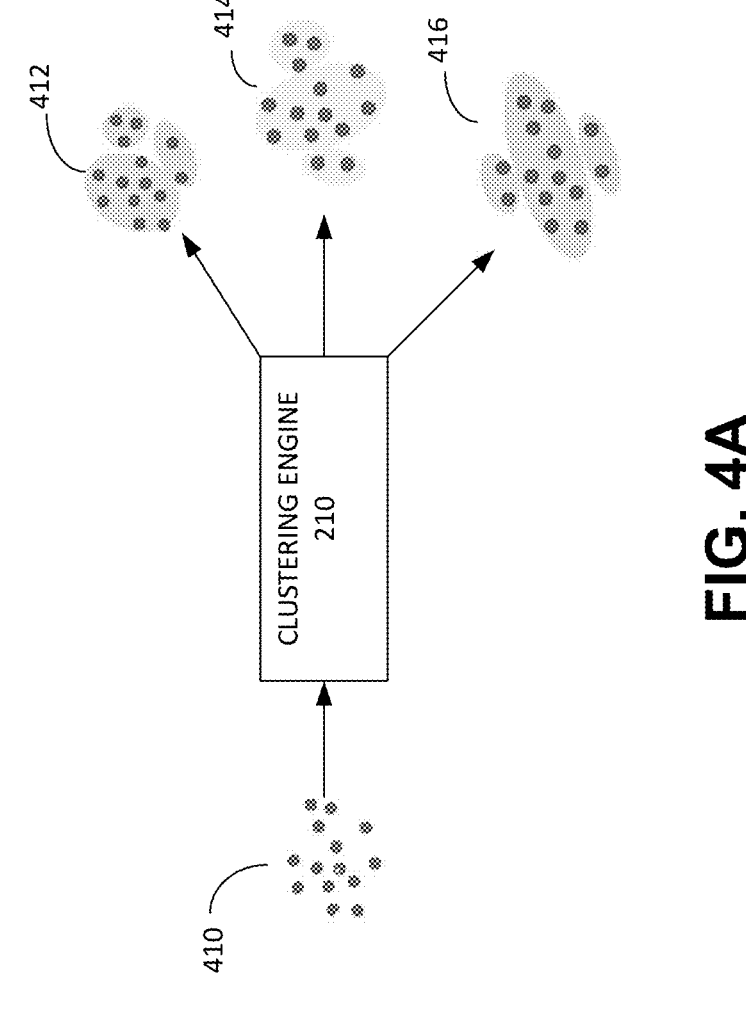
FIGS. 4A-4B depict an example of clustering and generating training data for a problematic cluster.
Figure 4B:
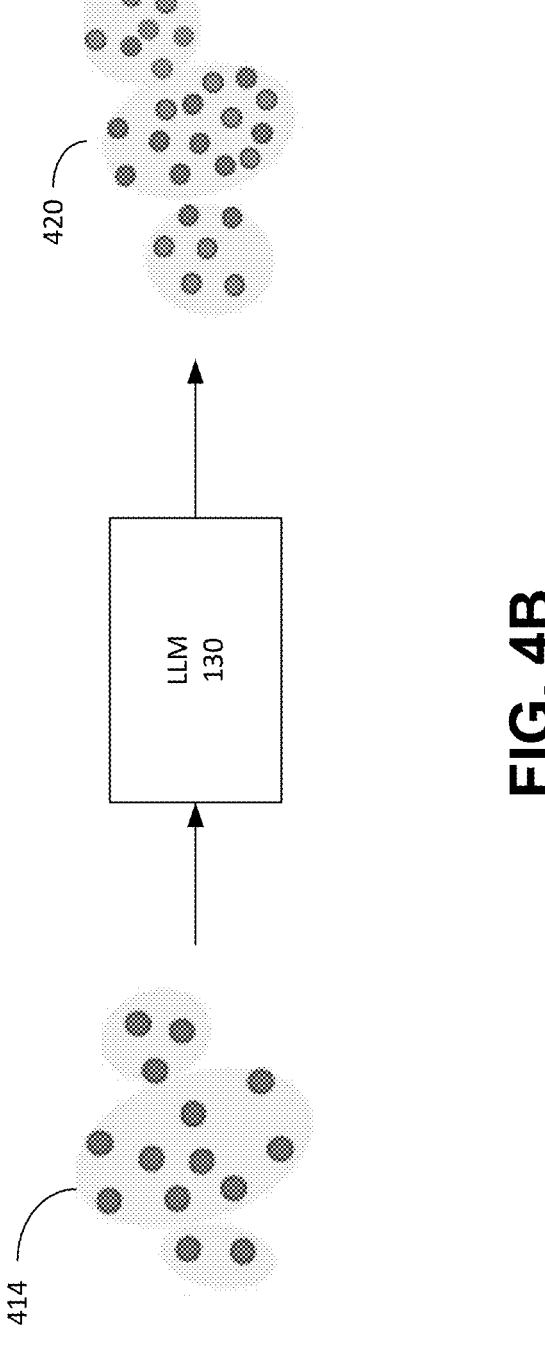

FIGS. 4A-4B depict an example of clustering and generating training data for a problematic cluster. FIG. 4A depicts an example of clustering and automatic subgroup discovery of problematic clusters that are good candidates for data augmentation. A dataset 410 is clustered into clusters 412, 414 and 416 by the clustering engine 210 using different clustering algorithms. Of the generated clusters, clusters 414 are identified as being good candidates for data augmentation as they have a high generalization in context measurement a low interference in context measurement. Thus, as depicted in FIG. 4B, clusters 414 are provided to the LLM 130 to generate augmented data for training the model. The resulting training dataset 420 many more datapoints related to the problematic clusters. As such, using the training dataset 420 for training the model results in improved performance of the model with respect to the problematic clusters.

FIG. 5 is a flow diagram depicting an exemplary method 500 for optimizing performance of an NLP model. One or more steps of method 500 may be performed by a targeted data generation system such as the targeted data generation system 110 of FIGS. 1-2 and/or by an LLM such as the LLM 130 of FIGS. 1-2. Method 500 may begin, at 502, and proceed to cluster a dataset using in training an NLP model, at 504. This may occur by first receiving a request to optimize the NLP and/or by receiving access to or retrieving the dataset. In some implementations, the dataset is a validation dataset used in training the NLP. Clustering the dataset is achieved via a plurality of clustering mechanisms such as those discussed above. In some implementations, a plurality of clustering mechanisms are used and clusters are identified from one or more of the clustering mechanisms. The clustering mechanisms are selected such that they are likely to generate clusters for which the NLP model does not perform well or performs worse than other clusters.

After clustering the training dataset, method 500 proceeds to measure a generalization in context parameter for one or more clusters in the plurality of clusters, at 506. In some implementations, the generalization in context parameter is measured for each cluster. The generalization in context parameter may be measured using a problematic cluster identification engine. In addition to the generalization in context parameter, method 500 also measures an interference in context parameter for one or more clusters, at 508. In some implementations, the interference in context parameter is also measured for each cluster. The generalization in context parameter measures an amount by which the performance of the NLP model can be improved by learning from additional data from the cluster. The interference in context parameter measures an amount by which training from additional data would negatively impact an overall performance of the NLP model. In some implementations, after the generalization in context and interference in context parameters are measures an aggregated generation in context and aggregate interference in context is generated by aggregating the measured generalization in context parameter and the measured interference in context parameter over all clusters of the plurality of clusters.

Once the generalization in context parameters and interference in context parameters are calculated, method 500 proceeds to identify a cluster from among the generated clusters for data augmentation, at 510. The cluster is identified based on at least one of the generalization in context parameters or the interference in context parameters. By examining the generalization in context and interference in context, method 500 identifies a cluster for which data augmentation is likely to improve the performance of the NLP model without negatively impacting the overall performance of the NLP model.

After a cluster has been identified, method 500 proceeds to generate a prompt for an LLM, at 512. The LLM may include or be a GPT model that generates text based on an input. The prompt may be generated based on data in the dataset that relates to the identified cluster. For example, the prompt may be datapoints from the identified cluster. Once the prompt is received by the LLM, the LLM generates synthetic training data similar to the prompt. This data is received from the LLM, at 514. In some implementations, a user labels the synthetically generated training data. In further implementations, a small local model is finetuned on the identified cluster and disagreements between the local model and the current version of the NLP model are used to rank the synthetically generated examples. Top rank results from the comparison are then used to generate more synthetic data and the process is repeated once the current version of the local model mostly agrees with the current version of the NLP model.

Once the synthetic training data for the identified cluster is received from the LLM and it is labeled and/or it is determined as being suitable for training, the synthetic training data is used as augmented training data for further training the NLP model, at 516. This ensures that the NLP model is trained with the right type and amount of data that improves the performance of the NLP model with respect to the identified cluster, but does not adversely affect the overall performance of the NLP model in other clusters. The process of identifying problematic clusters and generating training data may be repeated for other clusters. Once the training data is used to further train the NLP model, method 500 ends at 518.

Figure 6:
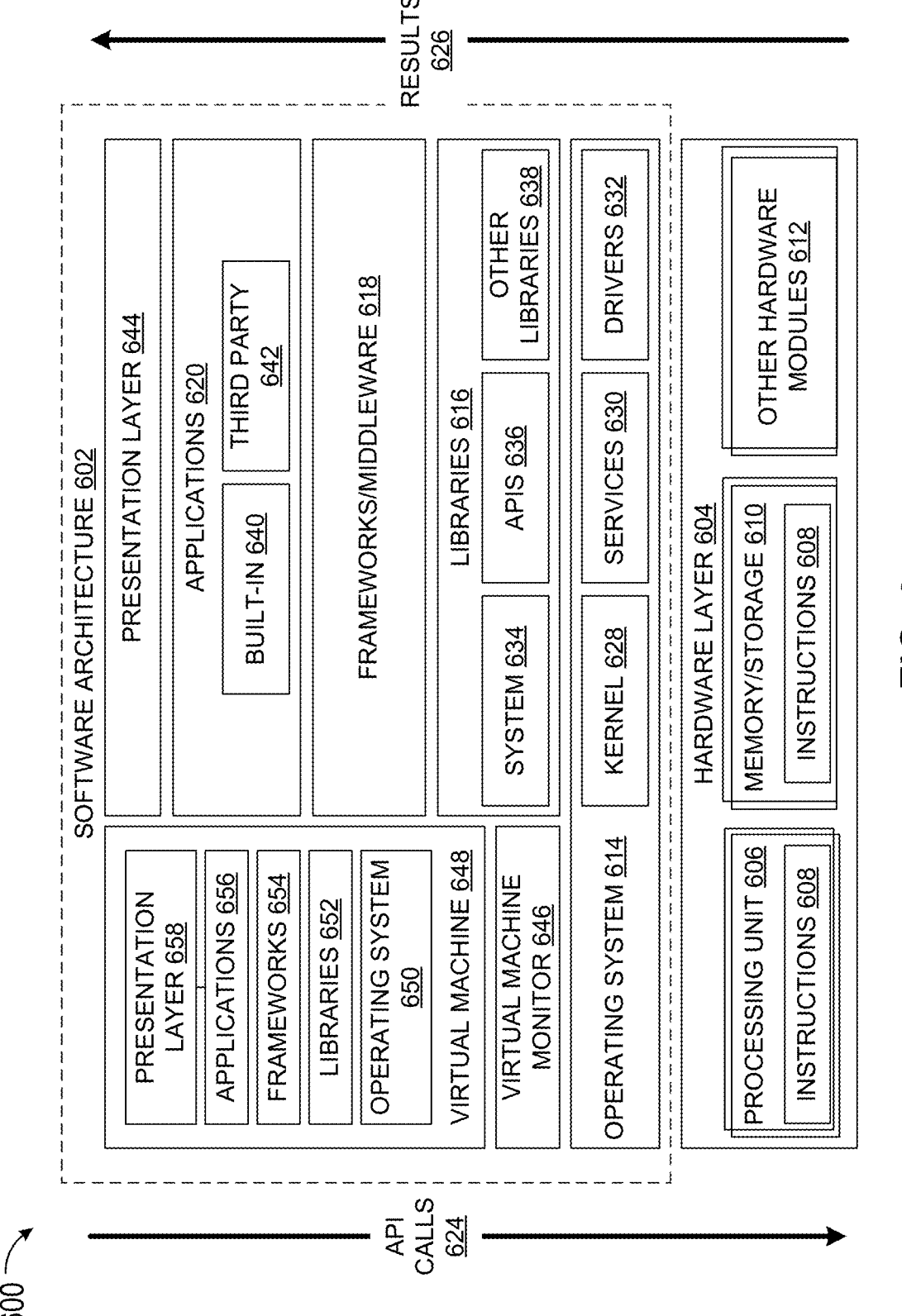
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/ modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
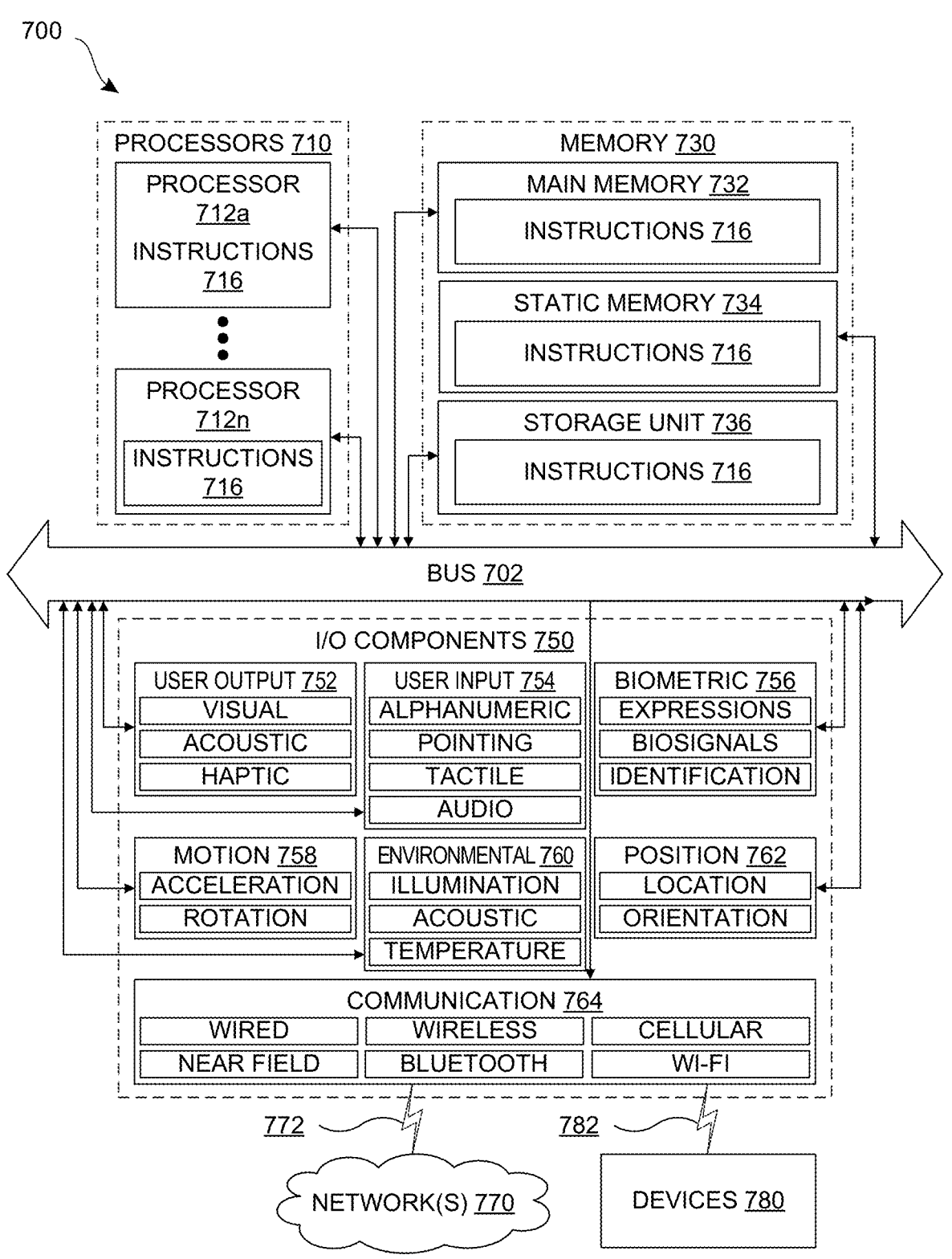
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
   a processor;
   a network interface for communicating with a plurality of client devices; and
   a memory in communication with the processor, the memory comprising executable instructions that, when executed by the processor, cause the data processing system to perform functions of:
      clustering, using a clustering engine, a dataset used in training a natural language processing (NLP) model into a plurality of clusters;
      measuring, using a problematic cluster identification engine, a generalization in context parameter for one or more of the plurality of clusters;
      measuring, using the problematic cluster identification engine, an interference in context parameter for one or more of the plurality of clusters;
      identifying a cluster, from among the plurality of clusters, for data augmentation, based on at least one of the measured generalization in context parameter or the measured interference in context parameter;
      generating a prompt for submission as an input to a large language model (LLM) to prompt the LLM to automatically generate augmented training data for the identified cluster;
      providing the prompt to the LLM;
      receiving from the LLM the augmented training data; and
      providing the augmented training data for use in further training the NLP model to improve a performance of the NLP model with respect to the identified cluster.

Item 2. The data processing system of item 1, wherein the LLM is a generative pretrained transformer.

Item 3. The data processing system of any of items 1 or 2, wherein an initial prompt for the LLM is generated from original data points related to the identified cluster.

Item 4. The data processing system of any preceding item, wherein the instructions further cause the data process system to perform operations of:

providing an output of the LLM to a user for labeling;

receiving from the user labeled data; and providing the labeled data as augmented training data for use in further training the NLP model.

Item 5. The data processing system of any preceding item, wherein the dataset used in training the NLP model is clustered into a plurality of clusters using a plurality of clustering mechanisms.

Item 6. The data processing system of item 5, wherein the plurality of clustering mechanisms include an agnostic clustering mechanism, a task-based clustering mechanism, and a task-based and same labeling mechanism.

Item 7. The data processing system of item 6, wherein the agnostic clustering mechanism uses general purpose embeddings to cluster the dataset.

Item 8. The data processing system of item 6, wherein the task-based clustering mechanism uses one of a plurality of NLP model's layers to cluster the dataset.

Item 9. The data processing system of item 6, wherein task-based and same labeling mechanism uses one of the plurality of the NLP model's layers with a requirement that datapoints in each cluster have the same label.

Item 10. A method for optimizing performance of a natural language processing (NLP) model comprising:

clustering, using a clustering engine, a validation dataset used in training the NLP model into a plurality of clusters;

measuring a generalization in context parameter for one or more of the plurality of clusters;

measuring an interference in context parameter for one or more of the plurality of clusters;

identifying a cluster, from among the plurality of clusters, for data augmentation, based on at least one of the measured generalization in context parameter or the measured interference in context parameter;

generating a prompt for submission as an input to a large language model (LLM) to prompt the LLM to automatically generate synthetic training data for the identified cluster;

providing the prompt to the LLM;

receiving from the LLM the synthetic training data; and using the synthetic training data to further train the NLP model to improve the performance of the NLP model with respect to the identified cluster.

Item 11. The method of claim 10, wherein the LLM is a GPT-3 model that generates data based on the prompt.

Item 12. The method of any of items 10 or 11, wherein the generalization in context parameter measures an amount by which the performance of the NLP model can be improved by learning from additional data from the cluster.

Item 13. The method of any of items 10-12, wherein the interference in context parameter measures an amount by which training from additional data would negatively impact an overall performance of the NLP model.

Item 14. The method of any of items 10-13, wherein identifying the cluster, based on at least one of the measured generalization in context parameter or the measured interference in context parameter includes:

aggregating the measured generalization in context parameter and the measured interference in context parameter over all clusters of the plurality of clusters;

ranking the clusters based on at least one of the aggregated measured generalization in context parameter and the aggregated measured interference in context parameter; and selecting a top ranked cluster as the identified cluster.

Item 15. The method of any of items 10-14, wherein the identified cluster is the cluster for which the NLP model's performance would improve by leaning from additional data without adversely impacting an overall performance of the NLP model.

Item 16. The method of any of items 10-15, further comprising dividing the validation dataset into a first set and a second set before clustering it, the first set being used for identifying the cluster and the second set being used for evaluation.

Item 17. The method of any of items 10-16, wherein identifying the cluster includes identifying the cluster for which the NLP model does not perform well.

Item 18. A non-transitory computer readable medium on which are stored instructions that, when executed, cause a programmable device to perform functions of:

accessing, using targeted data generation system, a dataset used in training a natural language processing (NLP) model;

clustering data in the dataset into a plurality of clusters using one or more clustering mechanisms;

identifying, using a problematic cluster identification engine, a cluster from among the plurality clusters for which the NLP model does not perform well;

determining that a performance of the NLP model for the identified cluster would improve if the NLP model is trained with more data related to the identified cluster;

upon determining that the performance of the NLP model for the identified cluster would improve if the NLP model is trained with more data related to the identified cluster, generating a prompt for submission as an input to a large language model (LLM) to prompt the LLM to automatically generate training data for the identified cluster;

receiving from the LLM the automatically generated training data for the identified cluster; and training the NLP model with the automatically generated training data to improve the performance of the NLP model for the identified cluster.

Item 19. The non-transitory computer readable medium of item 18, wherein the instructions, when executed, further cause the programmable device to perform functions of:

determining that an overall performance of the NLP model would not be adversely impacted if the NLP model is trained with more data related to the identified cluster; and upon determining that an overall performance of the NLP model would not be adversely impacted and determining that the performance of the NLP model for the identified cluster would improve if the NLP model is trained with more data related to the identified cluster, generating the prompt for submission as the input to the LLM.

Item 20. The non-transitory computer readable medium of any of items 18 or 19, wherein determining that the performance of the NLP model for the identified cluster would improve if the NLP model is trained with more data related to the identified cluster includes measuring a generalization in context parameter for the identified cluster.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor;
    a network interface for communicating with a plurality of client devices; and
    a memory in communication with the processor, the memory comprising executable instructions that, when executed by the processor, cause the data processing system to perform functions of:
    clustering, a dataset used in training a natural language processing (NLP) model into a plurality of clusters;
    dividing each of the plurality of clusters into two random sets, a first set for discovery of problematic clusters and a second set for validation;
    inputting the random sets to the NLP model;
    based on outputs of the NLP model, identifying clusters for which the NLP model underperforms compared to a corresponding validation set based on a first threshold; and
    determining a generalization in context parameter based on whether adding more training data to the validation set causes the NLP model to perform more accurately with respect to the plurality of clusters;
    determining an interference in context parameter for one or more of the plurality of clusters, wherein the interference in context parameter indicates whether augmenting a given cluster leads to worse performance on original data based on a second threshold;
    identifying a cluster, from among the plurality of clusters, for data augmentation, based on at least one of the generalization in context parameter or the interference in context parameter;
    using a large language model (LLM) to generate augmented training data for the identified cluster;
    further training the NLP model with the augmented training data to improve a performance of the NLP model with respect to the identified cluster; and
    using the further trained NLP model to process an input dataset.

2. The data processing system of claim 1, wherein the LLM is a generative pretrained transformer.

3. The data processing system of claim 1, wherein an initial prompt for the LLM is generated from original data points related to the identified cluster.

4. The data processing system of claim 1, wherein the instructions further cause the data processing system to perform operations of:
    providing an output of the LLM to a user for labeling;
    receiving from the user labeled data; and providing the user labeled data as augmented training data for use in further training the NLP model.

5. The data processing system of claim 1, wherein the dataset used in training the NLP model is clustered into a plurality of clusters using a plurality of clustering mechanisms.

6. The data processing system of claim 5, wherein the plurality of clustering mechanisms include an agnostic clustering mechanism, a task-based clustering mechanism, and a task-based and same labeling mechanism.

7. The data processing system of claim 6, wherein the agnostic clustering mechanism uses general purpose embeddings to cluster the dataset.

8. The data processing system of claim 6, wherein the task-based clustering mechanism uses one of a plurality of NLP model's layers to cluster the dataset.

9. The data processing system of claim 6, wherein task-based and same labeling mechanism uses one of the plurality of the NLP model's layers with a requirement that datapoints in each cluster have the same label.

10. A method for optimizing performance of a natural language processing (NLP) model comprising:

clustering a validation dataset used in training the NLP model into a plurality of clusters;

dividing each of the plurality of clusters into two random sets, a first set used for discovery of problematic clusters and a second set for evaluation;

inputting the divided clusters to the NLP model;

based on outputs of the NLP model, identifying clusters for which the NLP model underperforms compared to the validation dataset based on a first threshold; and determining a generalization in context parameter by determining whether adding more training data to the validation dataset improves performance on a given cluster;

determining an interference in context parameter for one or more of the plurality of clusters, wherein the interference in context parameter indicates whether augmenting a given cluster leads to worse performance on original data based on a second threshold;

identifying a cluster, from among the plurality of clusters, for data augmentation, based on at least one of the generalization in context parameter or the interference in context parameter;

generating a prompt for submission as an input to a large language model (LLM) to generate synthetic training data for the identified cluster;

providing the prompt to the LLM; using the synthetic training data to further train the NLP model to improve the performance of the NLP model with respect to the identified cluster; and using the further trained NLP model to process an input dataset.

11. The method of claim 10, wherein the LLM is a GPT-3 model that generates data based on the prompt.

12. The method of claim 10, wherein the generalization in context parameter measures an amount by which the performance of the NLP model can be improved by learning from additional data from the cluster.

13. The method of claim 10, wherein the interference in context parameter measures an amount by which training from additional data would negatively impact an overall performance of the NLP model.

14. The method of claim 10, wherein identifying the cluster, based on at least one of the generalization in context parameter or the interference in context parameter includes:

aggregating the generalization in context parameter and the interference in context parameter over all clusters of the plurality of clusters;

ranking the clusters based on at least one of the aggregated measured generalization in context parameter and the aggregated measured interference in context parameter; and selecting a top ranked cluster as the identified cluster.

15. The method of claim 10, wherein the identified cluster is the cluster for which the NLP model's performance would improve by leaning from additional data without adversely impacting an overall performance of the NLP model.

16. The method of claim 10, further comprising dividing the validation dataset into a first set and a second set before clustering it, the first set being used for identifying the cluster and the second set being used for evaluation.

17. The method of claim 10, wherein identifying the cluster includes identifying the cluster for which the NLP model does not perform well.

18. A non-transitory computer readable medium on which are stored instructions that, when executed, cause a programmable device to perform functions of:

accessing a dataset used in training a natural language processing (NLP) model;

clustering data in the dataset into a plurality of clusters using one or more clustering mechanisms;

identifying a problematic cluster from among the plurality clusters by: clustering a validation dataset by dividing each of the plurality of clusters into two random sets, a first set used for discovery of problematic clusters and a second set for evaluation;

inputting the divided clusters to the NLP model; and based on outputs of the NLP model, identifying the problematic cluster as a cluster for which the NLP model underperforms compared to the validation dataset based on a first threshold;

determining that a performance of the NLP model for the identified problematic cluster would improve if the NLP model is trained with more data related to the identified cluster;

upon determining that the performance of the NLP model for the identified cluster would improve if the NLP model is trained with more data related to the identified cluster, prompting a large language model (LLM) to generate training data for the identified cluster;

training the NLP model with the generated training data to improve the performance of the NLP model for the identified cluster; and using the trained NLP model to process an input dataset.

19. The non-transitory computer readable medium of claim 18, wherein the instructions, when executed, further cause the programmable device to perform functions of:

determining that an overall performance of the NLP model would not be adversely impacted if the NLP model is trained with more data related to the identified cluster; and in response to determining that the overall performance of the NLP model would not be adversely impacted and determining that the performance of the NLP model for the identified cluster would improve if the NLP model is trained with more data related to the identified cluster, generating a prompt for submission to the LLM.

20. The non-transitory computer readable medium of claim 18, wherein determining that the performance of the NLP model for the identified cluster would improve if the NLP model is trained with more data related to the identified cluster includes measuring a generalization in context parameter for the identified cluster.

* * * * *